US010109246B2

(12) United States Patent
Xiong

(10) Patent No.: US 10,109,246 B2
(45) Date of Patent: Oct. 23, 2018

(54) DRIVING DEVICE OF LIQUID CRYSTAL DISPLAY PANEL

(71) Applicant: Shenzhen China Star Optoelectronics Technology Co., Ltd., Shenzhen (CN)

(72) Inventor: Zhi Xiong, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 154 days.

(21) Appl. No.: 15/126,646

(22) PCT Filed: Jul. 12, 2016

(86) PCT No.: PCT/CN2016/089750
§ 371 (c)(1),
(2) Date: Sep. 16, 2016

(87) PCT Pub. No.: WO2017/201830
PCT Pub. Date: Nov. 30, 2017

(65) Prior Publication Data
US 2018/0166031 A1    Jun. 14, 2018

(30) Foreign Application Priority Data

May 23, 2016    (CN) .......................... 2016 1 0344993

(51) Int. Cl.
G09G 3/36        (2006.01)
G02F 1/133       (2006.01)
G09G 3/3233      (2016.01)

(52) U.S. Cl.
CPC ....... *G09G 3/3614* (2013.01); *G02F 1/13306* (2013.01); *G09G 3/3233* (2013.01);
(Continued)

(58) Field of Classification Search
CPC ..... G09G 2320/0693; G09G 2320/041; G09G 3/3696; G02F 1/133382
See application file for complete search history.

(56) References Cited

U.S. PATENT DOCUMENTS 7,786,966 B2    8/2010   Nakanishi et al.
2004/0046705 A1  3/2004  Masazumi et al.
(Continued)

FOREIGN PATENT DOCUMENTS

CN    10484214    3/2004
CN    1896813     1/2007
(Continued)

OTHER PUBLICATIONS

International Search Report for PCT/CN2016/089750, Completed by the Chinese Patent Office dated Jan. 12, 2017, 11 Pages.

*Primary Examiner* — Abbas I Abdulselam
(74) *Attorney, Agent, or Firm* — Mintz Levin Cohn Ferris Glovsky and Popeo, P.C.; Kongsik Kim

(57) ABSTRACT

A driving device of a liquid crystal display panel, including: a data driver, wherein the data driver includes a temperature detection module, and the data driver outputs a feedback signal according to the detected temperature; and a timing controller to provide a polarity control signal to the data driver, wherein the timing controller receives the feedback signal, and controls the polarity inversion manner indicated by the polarity control signal according to the received feedback signal. The driving device of the liquid crystal display panel adjusts a period of the polarity control signal provided to the data controller by the timing controller according to the feedback signal transmitted to the timing controller by the data driver, so as to control the polarity inversion manner indicated by the polarity control signal, thereby improving display quality of the liquid crystal
(Continued)

display panel prominently, and reducing production cost effectively.

6 Claims, 1 Drawing Sheet

(52) U.S. Cl.
CPC ............ *G09G 3/36* (2013.01); *G09G 3/3648* (2013.01); *G09G 3/3696* (2013.01); *G09G 2310/0275* (2013.01); *G09G 2310/06* (2013.01)

(56) References Cited

U.S. PATENT DOCUMENTS

| | | | |
|---|---|---|---|
| 2007/0070003 | A1 | 3/2007 | Nakamura et al. |
| 2008/0012814 | A1* | 1/2008 | Kim ............... G09G 3/3614 345/96 |
| 2008/0129904 | A1 | 6/2008 | Kang et al. |
| 2012/0146976 | A1* | 6/2012 | Lee ............... G09G 3/3688 345/211 |
| 2013/0120233 | A1* | 5/2013 | Jeon ............... G09G 3/36 345/101 |
| 2015/0355488 | A1 | 12/2015 | Wang |
| 2016/0027412 | A1* | 1/2016 | Igawa ............. G09G 3/3648 345/213 |
| 2016/0351129 | A1* | 12/2016 | Kim ............... G09G 3/3258 |

FOREIGN PATENT DOCUMENTS

| | | |
|---|---|---|
| CN | 104064155 | 9/2014 |
| CN | 105261344 | 1/2016 |

\* cited by examiner

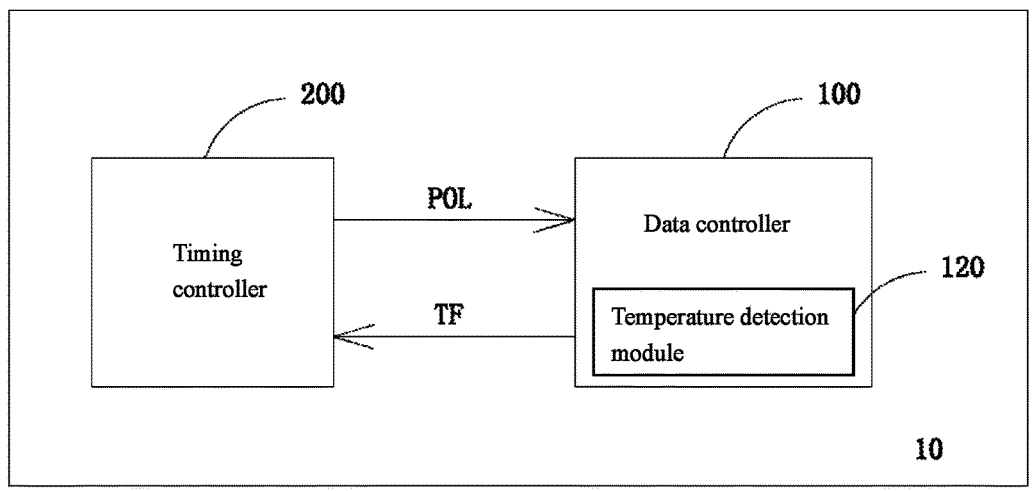

DRIVING DEVICE OF LIQUID CRYSTAL DISPLAY PANEL

BACKGROUND OF THE INVENTION

1. Field of the Disclosure

The present invention generally relates to a liquid crystal display field, and more particularly, to a driving device of a liquid crystal panel.

2. Description of the Prior Art

A technology of a liquid crystal panel is a display technology of rotating a special angle based on a voltage applied to a liquid crystal molecule. By changing a driving voltage applied to both ends of the liquid crystal molecule, the liquid crystal molecule generates a corresponding rotation, such that a traveling direction of light from a light source generated by a backlight unit changes, and different grayscales brightness may be presented at red, green and blue light filters located on the liquid crystal layer through different rotating angles of the liquid crystal molecule. By combining red, blue and green sub-pixel display points having different grayscales brightness, a single pixel display point having different changed colors may be formed.

Characteristic of the liquid crystal molecule lies in, if a polarity of the driving voltage applied to the liquid crystal molecule does not change all the time, the liquid crystal molecule may be damaged without being restored. Thus, in a case where a value of the driving voltage of both ends of the liquid crystal molecule maintains unchanged, the voltage polarity of the driving voltage needs to be inverted at intervals. That is, a positive voltage polarity and a negative voltage polarity of the driving voltages are performed polarity exchanges with respect to a common electrode. When an absolute value of a voltage difference between a voltage of a pixel electrode and a common voltage is fixed, whatever the voltage polarity of the pixel electrode is positive or negative, the grayscale brightness presented by the pixel electrode is the same, whereas a diversion direction of the liquid crystal molecule is opposite, so as to avoid characteristic damage caused for the reason that a direction of the liquid crystal molecule is fixed to be the same.

The polarity inversion manners include: a frame inversion, a column inversion, a row inversion and a dot inversion. Wherein, there is a problem of inherent bad image quality in the frame inversion and column inversion, and thus, as a consumer requires more and more high image quality, the liquid crystal panel gradually changes to manners of the row inversion (such as a two-line inversion) and dot inversion, to improve the image quality. However, along with a development of the liquid crystal panel toward a large size, a high resolution and a high refresh rate, problems of high power consumption, overheating of a data driver and so on caused by the row inversion and dot inversion become main technical problems of designing the liquid crystal display panel.

Therefore, a new driving device of the liquid crystal display panel is urged to be developed to solve the above existing problems.

SUMMARY

A purpose of the present invention is to provide a driving device of a liquid crystal display panel, which is capable of improving image quality of the liquid crystal display panel prominently.

In order to achieve the above inventive purpose, the present invention provides a driving device of a liquid crystal display panel, comprising: a data driver, wherein the data driver includes a temperature detection module to detect a temperature of the data driver, and the data driver outputs a feedback signal according to the detected temperature; and a timing controller to provide a polarity control signal to the data driver, wherein the timing controller receives the feedback signal, and controls the polarity inversion manner indicated by the polarity control signal according to the received feedback signal.

The data driver outputs the feedback signal according to a comparison result between the temperature detected by the temperature detection module and a preset temperature.

The polarity control signal is a periodically logic level.

The timing controller adjusts a period of the polarity control signal according to the received feedback signal, so as to control the polarity inversion manner indicated by the polarity control signal.

The polarity inversion manner indicated by the period of the polarity control signal is a frame inversion, a column inversion, a row inversion, or a dot inversion.

If the temperature of the data driver detected by the temperature detection module is greater than or equal to the preset temperature, the data driver outputs a feedback signal having a first level, and the timing controller controls the polarity inversion manner indicated by the polarity control signal to be the frame inversion or column inversion in response to the received feedback signal having the first level.

The timing controller adjusts the period of the polarity control signal to be a period corresponding to the frame inversion or a period corresponding to the column inversion in response to the received feedback signal having the first level.

If the temperature of the data driver detected by the temperature detection module is smaller than the preset temperature, the data driver outputs a feedback signal having a second level, and the timing controller controls the polarity inversion manner indicated by the polarity control signal to be the row inversion or dot inversion in response to the received feedback signal having the second level.

The timing controller adjusts the period of the polarity control signal to be a period corresponding to the row inversion or a period corresponding to the dot inversion in response to the received feedback signal having the second level.

The present invention provides a driving device of a liquid crystal display panel, and by detecting a temperature of a data driver through a temperature detection module disposed in the data driver, and outputting a feedback signal to a timing controller according to the detected temperature, the timing controller controls the polarity inversion manner indicated by the polarity control signal according to the received feedback signal. The driving device of the liquid crystal display panel adjusts a period of the polarity control signal provided to a data controller by the timing controller according to the feedback signal transmitted to the timing controller by the data driver, so as to control the polarity inversion manner indicated by the polarity control signal, thereby improving display quality of the liquid crystal display panel prominently, and reducing production cost effectively.

BRIEF DESCRIPTION OF THE DRAWINGS

FIG. 1 illustrates a block diagram of a driving device of a liquid crystal display panel according to an embodiment of the present invention.

DETAILED DESCRIPTION OF EXEMPLARY EMBODIMENTS

A driving device of a liquid crystal display panel according to an embodiment of the present invention is described below referring to FIG. 1.

FIG. 1 illustrates a block diagram of a driving device of a liquid crystal display panel according to an embodiment of the present invention. Referring to FIG. 1, the embodiment of the present invention provides a driving device 10 of a liquid crystal display panel, including: a data driver 100 (Source driver IC) and a timing controller 200 (Timing control IC), wherein the data driver 100 includes a temperature detection module 120.

In specific, the temperature detection module 120 is used to detect a temperature of the data driver 100, and the data driver 100 outputs a feedback signal TF according to the detected temperature. The data driver 100 outputs the feedback signal according to a comparison result between the temperature detected by the temperature detection module 120 and a preset temperature of the data driver 100.

In specific, the timing controller 200 provides a polarity control signal (hereinafter referred to a POL) to the data driver 100, wherein the timing controller 200 receives the feedback signal TF, and controls the polarity inversion manner indicated by the POL according to the received feedback signal TF. Specifically, the timing controller 200 adjusts a period of the POL according to the received feedback signal TF, so as to control the polarity inversion manner indicated by the POL.

Preferably, the POL is a periodically logic level.

In the present embodiment, the polarity inversion manner indicated by the period of the POL is the frame inversion, column inversion, row inversion, or dot inversion. In other words, different periods indicate different polarity inversion manners.

As an example, if a temperature of the data driver 100 detected by the temperature detection module 120 is greater than or equal to the preset temperature, the data driver 100 outputs a feedback signal having a first level, and the timing controller 200 controls the polarity inversion manner indicated by the POL to be the frame inversion or column inversion in response to the received feedback signal having the first level. In other words, the timing controller 200 adjusts the period of the POL to be a period corresponding to the frame inversion or a period corresponding to the column inversion in response to the received feedback signal having the first level.

As an example, if a temperature of the data driver 100 detected by the temperature detection module 120 is smaller than the preset temperature, the data driver 100 outputs a feedback signal having a second level, and the timing controller 200 controls the polarity inversion manner indicated by the POL to be the row inversion or dot inversion in response to the received feedback signal having the second level. In other words, the timing controller 200 adjusts the period of the POL to be a period corresponding to the row inversion or a period corresponding to the dot inversion in response to the received feedback signal having the second level.

It should be understood that, the liquid crystal display panel can adopt the dot inversion or row inversion to improve the display quality when designing an architecture, and if a temperature detected by the temperature detection module is smaller than the preset temperature of the data driver, the liquid crystal display panel adopts the dot inversion or row inversion manner continuously; and when the data driver is overheated, that is, the temperature detected by the temperature detection module is greater than or equal to the preset temperature of the data driver, the liquid crystal display panel adopts the frame inversion or column inversion, to reduce the temperature of the data driver, thereby displaying higher image quality under the majority of images without increasing production cost.

The driving device of the liquid crystal display panel according to the above embodiments of the present invention adjusts a period of the polarity control signal provided to the data controller by the timing controller according to the feedback signal transmitted to the timing controller by the data driver, so as to control the polarity inversion manner indicated by the polarity control signal, thereby improving display quality of the liquid crystal display panel prominently, and reducing production cost effectively.

The present invention has been described with reference to the above embodiments thereof, however, implementation of the present invention is not limited thereto. Within a spirit and scope of the present invention, those skilled in the art may make various modifications and changes, and these modifications and changes will fall within scopes defined by claims.

The invention claimed is:

1. A driving device of a liquid crystal display panel, comprising:
    a data driver, wherein the data driver comprises a temperature detection module to detect a temperature of the data driver, and the data driver outputs a feedback signal according to the detected temperature; and
    a timing controller to provide a polarity control signal to the data driver, wherein the timing controller receives the feedback signal, and controls the polarity inversion manner indicated by the polarity control signal according to the received feedback signal,
    wherein if the temperature of the data driver detected by the temperature detection module is greater than or equal to a preset temperature, the data driver outputs a feedback signal having a first level, and the timing controller controls the polarity inversion manner indicated by the polarity control signal to be the frame inversion or column inversion in response to the received feedback signal having the first level; and
    wherein if the temperature of the data driver detected by the temperature detection module is smaller than the preset temperature, the data driver outputs a feedback signal having a second level, and the timing controller controls the polarity inversion manner indicated by the polarity control signal to be the row inversion or dot inversion in response to the received feedback signal having the second level.

2. The driving device of claim 1, wherein the polarity control signal is a periodically logic level.

3. The driving device of claim 1, wherein the timing controller adjusts a period of the polarity control signal according to the received feedback signal, so as to control the polarity inversion manner indicated by the polarity control signal.

4. The driving device of claim 3, wherein the polarity inversion manner indicated by the period of the polarity control signal is a frame inversion, a column inversion, a row inversion, or a dot inversion.

5. The driving device of claim 1, wherein the timing controller adjusts the period of the polarity control signal to be a period corresponding to the frame inversion or a period corresponding to the column inversion in response to the received feedback signal having the first level.

6. The driving device of claim 5, wherein the timing controller adjusts the period of the polarity control signal to be a period corresponding to the row inversion or a period corresponding to the dot inversion in response to the received feedback signal having the second level.

\* \* \* \* \*